US009979313B2

(12) United States Patent
Mouridsen

(10) Patent No.: US 9,979,313 B2
(45) Date of Patent: May 22, 2018

(54) 3-LEVEL POWER TOPOLOGY

(71) Applicant: SCHNEIDER ELECTRIC IT CORPORATION, West Kingston, RI (US)

(72) Inventor: Jonas Sonsby Mouridsen, Odense V (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days. days.

(21) Appl. No.: 15/320,622

(22) PCT Filed: Jun. 27, 2014

(86) PCT No.: PCT/US2014/044551
§ 371 (c)(1),
(2) Date: Dec. 20, 2016

(87) PCT Pub. No.: WO2015/199718
PCT Pub. Date: Dec. 30, 2015

(65) Prior Publication Data
US 2017/0149346 A1    May 25, 2017

(51) Int. Cl.
*H02M 5/458* (2006.01)
*H02J 9/06* (2006.01)
(Continued)

(52) U.S. Cl.
CPC ..... *H02M 5/4585* (2013.01); *H02J 2009/063* (2013.01); *H02M 1/4216* (2013.01);
(Continued)

(58) Field of Classification Search
CPC ....... H02M 2001/0058; H02M 1/4216; H02M 5/458; H02M 5/4585; H02M 7/487;
(Continued)

(56) References Cited

U.S. PATENT DOCUMENTS 4,730,242 A   3/1988 Divan
5,017,800 A   5/1991 Divan
(Continued)

FOREIGN PATENT DOCUMENTS

| JP | 2013247724 A | 12/2013 |
|----|--------------|---------|
| WO | 2007003544 A2 | 1/2007 |
| WO | 2015065363 A1 | 5/2015 |

OTHER PUBLICATIONS

Notification of Transmittal of the International Search Report and the Written Opinion of the International Searching Authority from corresponding PCT/US2014/044551 dated Nov. 7, 2014.

(Continued)

*Primary Examiner* — Fred E Finch, III
(74) *Attorney, Agent, or Firm* — Lando & Anastasi, LLP

(57) ABSTRACT

According to one aspect, embodiments of the invention provide a power supply system comprising an input configured to receive input AC power from an input power source, an output configured to provide output AC power to a load, a converter coupled to the input and configured to convert the input AC power into converted DC power, a first DC bus coupled to the converter and configured to receive the converted DC power, an inverter coupled to the first DC bus and the output and configured to convert DC power from the first DC bus into the output AC power, a first DC switch circuit coupled between the first DC bus and neutral and a controller coupled to the first DC switch circuit and configured to operate the first DC switch circuit such that voltage on the first DC bus is zero during switching operation of the converter and the inverter.

20 Claims, 5 Drawing Sheets

(51) Int. Cl.
*H02M 1/42* (2007.01)
*H02M 1/00* (2006.01)

(52) U.S. Cl.
CPC .... *H02M 2001/0058* (2013.01); *Y02B 70/126* (2013.01); *Y02B 70/1491* (2013.01)

(58) Field of Classification Search
CPC ... Y02B 70/126; Y02B 70/1491; H02J 7/007; H02J 9/062; H02J 2009/063
See application file for complete search history.

(56) References Cited

U.S. PATENT DOCUMENTS

| | | | | |
|---|---|---|---|---|
| 5,982,646 | A * | 11/1999 | Lyons | H02M 1/34 363/128 |
| 2006/0109694 | A1* | 5/2006 | Peng | H02M 7/4826 363/37 |
| 2006/0152085 | A1 | 7/2006 | Flett et al. | |
| 2008/0291708 | A1* | 11/2008 | Teichmann | H02M 1/32 363/50 |
| 2009/0196072 | A1 | 8/2009 | Ye | |
| 2011/0025246 | A1* | 2/2011 | Sakakibara | H02M 1/4216 318/400.42 |
| 2011/0134672 | A1 | 6/2011 | Sato et al. | |
| 2016/0049892 | A1* | 2/2016 | Moghadas | H02P 23/0081 166/66.4 |

OTHER PUBLICATIONS

Extended European Search Report from corresponding European Application No. 14896115.4 dated Feb. 5, 2018.

\* cited by examiner

3-LEVEL POWER TOPOLOGY

CROSS-REFERENCE TO RELATED APPLICATIONS

This application is a U.S. National Stage Application under 35 U.S.C. § 371 of International Application No. PCT/US2014/044551, filed Jun. 27, 2014, titled 3-LEVEL POWER TOPOLOGY, which is hereby incorporated herein by reference in its entirety.

BACKGROUND

1. Field of the Disclosure

Embodiments of the present disclosure relate generally to systems and methods for providing power.

2. Description of Background

A power supply, such as an uninterruptible power supply (UPS) is typically used to provide power to an electrical device or load. A UPS can provide power while a primary power source, or mains, is unavailable. A conventional online UPS rectifies input power provided by an electric utility using a Power Factor Correction circuit (PFC) to provide power to a DC bus. The rectified DC voltage is typically used to charge a battery while mains power is available, as well as to provide power to the DC bus. In the absence of mains power, the battery provides power to the DC bus. From the DC bus, an inverter generates an AC output voltage to the load. Since the DC bus is powered either by mains or the battery, the output power of the UPS is uninterrupted if the mains fails and the battery is sufficiently charged.

SUMMARY

At least some aspects and embodiments of the invention are directed toward a power supply system comprising an input configured to receive input AC power from an input power source, an output configured to provide output AC power to a load, a converter coupled to the input and configured to convert the input AC power into converted DC power, a first DC bus coupled to the converter and configured to receive the converted DC power, an inverter coupled to the first DC bus and the output and configured to convert DC power from the first DC bus into the output AC power, a first DC switch circuit coupled between the first DC bus and a neutral point and a controller coupled to the first DC switch circuit and configured to operate the first DC switch circuit such that voltage on the first DC bus is zero during switching operation of the converter and the inverter.

According to one embodiment, the converter includes at least one first switch coupled between the input and the neutral point, the inverter includes at least one second switch coupled between the first DC bus and the output, and the controller is coupled to the at least one first switch and the at least one second switch and is further configured to operate switching of the at least one first switch to generate the DC power, to operate switching of the at least one second switch to generate the output AC power, and to operate the first DC switch circuit such that voltage across the at least one first switch is zero during turn-on switching and voltage across the at least one second switch is zero during turn-off switching.

According to another embodiment, first DC switch circuit comprises a DC switch coupled between the first DC bus and the neutral point, and a diode coupled in parallel with the DC switch between the first DC bus and the neutral point, wherein in operating the first DC switch circuit such that voltage on the first DC bus is zero, the controller is further configured to operate the DC switch to turn off. In one embodiment, the controller is further configured to synchronize the turn-on switching of the at least one first switch with the turn-off switching of the at least one second switch over a synchronized switching period. In another embodiment, the controller is further configured to turn off the DC switch at a first time before the synchronized switching period.

According to one embodiment, the power supply system is configured to operate such that at the first time before the synchronized switching period, current at the output is greater than current at the input. In one embodiment, the power supply system further comprises a capacitor coupled to the neutral point, and a second DC bus coupled between the capacitor and the first DC switch circuit, wherein at the first time before the synchronized switching period, the DC power converted by the inverter into the output AC power is derived from the converted DC power and DC power from the second DC bus.

According to another embodiment, the power supply system further comprises at least one DC input line configured to be coupled to a DC source, and a DC/DC converter coupled between the at least one DC input line and the first DC bus and configured to receive backup DC power from the DC source and provide regulated DC power to the first DC bus, wherein the DC power converted by the inverter into the output AC power is derived from at least one of the converted DC power and the backup DC power.

According to one embodiment, the DC/DC converter comprises at least one first DC/DC switch coupled between the at least one DC input line and the neutral point, wherein the controller is further coupled to the at least one first DC/DC switch and is further configured, where the DC power converted by the inverter into the output AC power is derived from the backup DC power, to operate the at least one first DC/DC switch to generate the regulated DC power, and to operate the first DC switch circuit such that voltage across the at least one first DC/DC switch is zero during turn-on.

According to another embodiment, the DC/DC converter comprises at least one second DC/DC switch coupled between the at least one DC input line and the first DC bus, wherein the controller is further coupled to the at least one second DC/DC switch and is further configured, where the DC power converted by the inverter into the output AC power is derived from the converted DC power, to operate the at least one second DC/DC switch to generate battery charging power from the converted DC power, and to operate the first DC switch circuit such that voltage across the at least one second DC/DC switch is zero during turn-off.

According to one embodiment, the power supply system is a three-phase power supply system including multiple segments, each segment configured to operate on one phase of 3-phase power received from the input power source, the first DC switch circuit is shared by multiple segments of the three-phase power supply system, and the controller is further configured to synchronize the switching operation of the converter and the inverter across each segment of the power supply system. In one embodiment, the power supply system further comprises a second DC bus coupled to the converter and configured to receive the converted DC power, and a second DC switch circuit coupled between the second DC bus and the neutral point, wherein the controller is further coupled to the second DC switch circuit and is further configured to operate the second DC switch circuit such that voltage on the second DC bus is zero during switching operation of the converter and the inverter.

Another aspect of the invention is directed towards a method for operating a power supply system, the power supply system comprising an input, a converter coupled to the input, a first DC bus coupled to the converter, an inverter coupled to the first DC bus, and an output, the method comprising receiving, at the input, input AC power from a power source, converting, with the converter, the input AC power into converted DC power, providing the converted DC power to the first DC bus, converting, with the inverter, DC power from the first DC bus into output AC power, providing the output AC power to the output, and controlling the power supply system such that voltage on the first DC bus goes to zero to provide Zero Voltage Switching (ZVS) in the converter and the inverter.

According to one embodiment, converting the input AC power includes switching at least one first switch of the converter to generate the converted DC power, converting DC power from the first DC bus includes switching at least one second switch of the converter to generate the output AC power, and controlling the power supply system such that voltage on the first DC bus goes to zero includes driving voltage across the at least one first switch to zero during turn-on switching and voltage across the at least one second switch to zero during turn-off switching.

According to another embodiment, the power supply system further comprises a first DC switch coupled between a neutral point and the first DC bus, and driving voltage across the at least one first switch to zero and voltage across the at least one second switch to zero includes turning off the first DC switch. In one embodiment, the method further comprises synchronizing the turn-on switching of the at least one first switch with the turn-off switching of the at least one second switch over a synchronized switching period. In another embodiment, turning off the first DC switch includes turning off the first DC switch at a first time before the synchronized switching period when current at the output is greater than current at the input.

According to one embodiment, the power supply system further comprises a second DC bus coupled to the converter, and the method further comprises controlling the power supply system such that voltage on the second DC bus goes to zero to provide ZVS in the converter and the inverter. In one embodiment, the power supply system is a three-phase power supply system, controlling the power supply system such that voltage on the first DC bus goes to zero includes selectively driving voltage on the first DC bus to zero to provide ZVS in the converter and the inverter across multiple phases of the power supply system, and the method further comprises synchronizing switching operation of the converter and the inverter across multiple phases of the power supply system.

At least one aspect of the invention is directed towards a three-phase power supply system comprising a plurality of inputs, each configured to receive one-phase of input 3-phase power from an input power source, a plurality of outputs, each configured to provide one-phase of output 3-phase power to a load, a converter coupled to the plurality of inputs and configured to convert the received input 3-phase power into converted DC power, at least one DC bus coupled to the converter and configured to receive the converted DC power, an inverter coupled to the at least one DC bus and the plurality of outputs and configured to convert DC power from the at least one DC bus into the output 3-phase power, and means for providing Zero Voltage Switching (ZVS) in the converter and the inverter across each phase of the three-phase power supply system.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
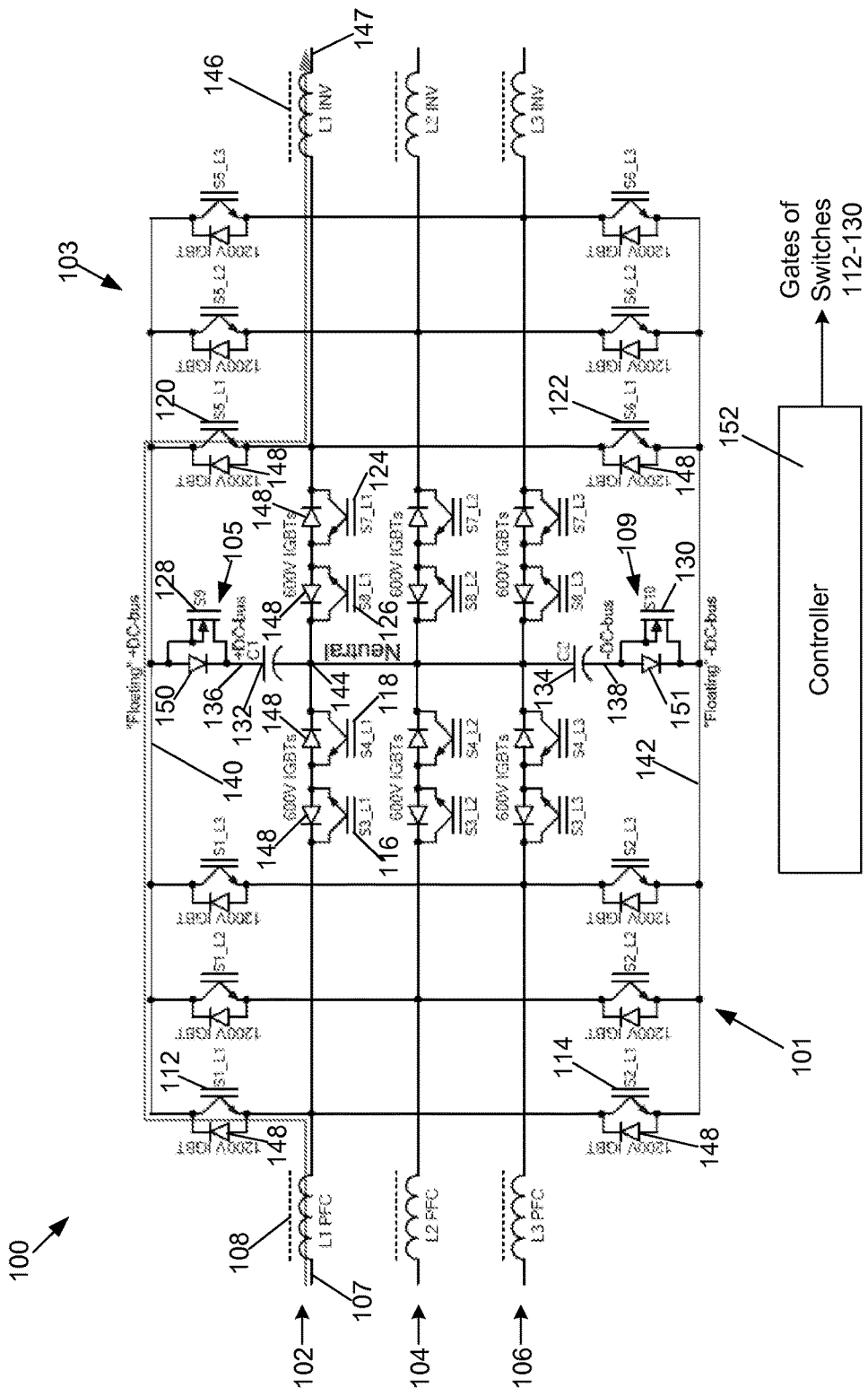
FIG. 1 is a schematic diagram of a 3 phase, 3-level UPS topology according to aspects of the present disclosure.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, UPS systems are commonly used to provide power to loads. High efficiency has become one of the most important parameters in UPS design and various solutions and/or topologies have been developed to increase the efficiency of a UPS. In some UPS systems, an eco-mode is available where the UPS is in a bypass operation or an off-line mode as long as mains voltage is available. This approach has disadvantages such as poor surge handling capability, unfiltered and unregulated output voltage, and no power factor correction. Other UPS systems include a delta conversion topology which provides output voltage regulation and power factor correction; however, surge handling capability and filtering is still limited, and a relatively large transformer is required. In other UPS systems, high efficiency levels are reached through the use of multilevel converters and/or emerging Gallium Nitride (GaN) or Silicon Carbide (SiC) semiconductors; however, such converters and semiconductors typically increase the cost and/or complexity of a UPS beyond acceptable levels. Still other UPS systems include a hybrid PFC and inverter topology; however, hybrid topologies are very hard to control as the PFC regulation and the inverter regulation affect each other. Additionally, hybrid topologies typically only have high efficiency when operating under normal operating conditions (e.g., when the input and output are in phase).

A new 3-level UPS topology that reduces overall switching losses (i.e., provides higher efficiency) is described herein. The 3-level UPS topology introduces Zero Voltage Switching (ZVS) at PFC switch turn on and also at inverter switch turn-off, thus reducing switching losses and enabling higher overall efficiency.

FIG. 1 is a schematic diagram of a 3-level UPS 100. The UPS 100 is a 3-phase UPS that includes three segments 102, 104, 106. Each segment 102, 104, 106 is configured to be coupled to one phase of a 3-phase power source. Each segment 102, 104, 106 is substantially the same and operates on its corresponding phase in substantially the same way. As such, the UPS 100 is discussed in greater detail below with regard to a first segment 102.

The UPS 100 includes a PFC converter 101, an inverter 103, a positive DC bus 136, a negative DC bus 138, a positive "floating" DC bus 140, a negative "floating" DC bus 142, a first DC switch circuit 105, a first capacitor 132, second DC switch circuit 109, a second capacitor 134, a neutral point 144, and a controller 152. The PFC converter 101 includes a first inductor 108, a first switch 112, a second switch 114, a third switch 116, and a fourth switch 118. The inverter 103 includes a fifth switch 120, a sixth switch 122, a seventh switch 124, an eighth switch 126, and a second inductor 146. The first DC switch circuit 105 includes a ninth switch 128 and a body diode 150. The second DC switch circuit 109 includes a tenth switch 130 and a body diode 151.

According to one embodiment, the first switch 112 and the second switch 114 are 1200V Insulated-Gate Bipolar Transistors (IGBT); however, in other embodiments, the IGBTs 112, 114 may be rated differently or different types of switches may be utilized (e.g., the IGBTs 112, 114 can be replaced with diodes if uni-directional power conversion in the PFC converter 101 is sufficient). In one embodiment, the fifth switch 120 and the sixth switch 122 are 1200V Insulated-Gate Bipolar Transistors (IGBT); however, in other embodiments, the IGBTs 120, 122 may be rated differently or different types of switches may be utilized. In one embodiment, the third switch 116, fourth switch 118, seventh switch 124, and eighth switch 126 are 600V IGBTs; however, in other embodiments, the IGBTs 116, 118, 124, 126 may be rated differently or different types of switches may be utilized. Each IGBT 112-126 also includes an internal diode 148 coupled between its collector and emitter.

According to one embodiment, the ninth switch 128 and tenth switch 130 are 600V Metal-Oxide-Semiconductor Field-Effect Transistors (MOSFET); however, in other embodiments, the MOSFETs 128, 130 may be rated differently or different types of switches may be utilized. The body diode 150 of the first DC switch circuit 105 is coupled between the source and the drain of the MOSFET 128. The body diode 151 of the second DC switch circuit 109 is coupled between the source and drain of the MOSFET 130.

A first terminal of the first inductor 108 is coupled to an input 107 of the UPS 100. The input 107 is configured to be coupled to a 3-phase power source. A second terminal of the first inductor 108 is coupled to the emitter of the first switch 112. The collector of the first switch 112 is coupled to the positive "floating" DC bus 140. The collector of the fifth switch 120 is coupled to the positive "floating" DC bus 140. The emitter of the fifth switch 120 is coupled to a first terminal of the second inductor 146. A second terminal of the second inductor 146 is coupled to an output 147 of the UPS 100. The collector of the second switch 114 is also coupled to the second terminal of the first inductor 108. The emitter of the second switch 114 is coupled to the negative "floating" DC bus 142. The emitter of the sixth switch 122 is also coupled to the negative "floating" DC bus 142. The collector of the sixth switch 122 is also coupled to the first terminal of the second inductor 146.

The collector of the third switch 116 is also coupled to the second terminal of the first inductor 108. The emitter of the third switch 116 is coupled to the emitter of the fourth switch 118. The collector of the fourth switch 118 is coupled to the neutral point 144. The collector of the eighth switch 126 is coupled to the neutral point 144. The emitter of the eighth switch 126 is coupled to the emitter of the seventh switch 124. The collector of the seventh switch 124 is also coupled to the first terminal of the second inductor 146. The source of the ninth switch 128 is coupled to the positive "floating" DC bus 140. The drain of the ninth switch 128 is coupled to the positive DC bus 136. A first terminal of the first capacitor 132 is coupled to the positive DC bus 136 and a second terminal of the first capacitor 132 is coupled to the neutral point. A first terminal of the second capacitor 134 is coupled to the neutral point 144 and a second terminal of the second capacitor 134 is coupled to the negative DC bus 138. The source of the tenth switch 130 is also coupled to the negative DC bus 138. The drain of the tenth switch 130 is coupled to the negative "floating" DC bus 142. The controller 152 is coupled to the gate of each switch 112-130.

Operation of the UPS 100 will now be described with regard to the positive portion of the input phase line at the first segment 102. Similar operation also occurs on the negative portion of the input phase line at the first segment 102. One phase of the AC 3-phase power provided by the 3-phase power source is received by the input 107. The controller 152 operates the PFC switches (i.e., the first switch 112 and the third switch 116) as a boost converter to convert the one phase of the AC 3-phase power into converted DC power. The controller 152 also operates the PFC switches (i.e., the first switch 112 and the third switch 116) to provide power factor correction at the input 107. The converted DC power is provided to the "floating" DC bus 140. The inverter switch (i.e., the fifth switch 120) is operated by the controller 152 as a buck converter to convert DC power from the positive "floating" DC bus 140 into regulated AC power. The regulated AC power is provided to the output 147.

Depending on the current at the output 147 of the UPS 100, the DC power provided to the inverter switch (i.e., the fifth switch 120) from the positive "floating" DC bus 140 may be derived from different portions of the UPS 100. For example, when the current at the output 147 of the UPS 100 is less than the current at the input 107 of the UPS 100, the DC power converted by the inverter switch (i.e., the fifth switch 120) is derived from the converted DC power provided by the PFC switches (i.e., the first switch 112 and the third switch 116) to the "floating" DC bus 140. In such an embodiment, a portion of the converted DC power on the "floating" DC bus 140 is also provided to the DC bus 136 via the ninth switch 128 (which is generally maintained on) to charge the first capacitor 132. When the current at the output 147 of the UPS 100 is greater than the current at the input 107 of the UPS 100, the first capacitor 132 discharges and discharged DC power is provided from the DC bus 136 to the "floating" DC bus 140 via the ninth switch 128. DC power derived from both the PFC switches (i.e., the first switch 112 and the third switch 116) and the DC bus 136 is provided to the inverter switch (i.e., the fifth switch 120) for conversion into regulated AC power.

The controller 152 also operates the switches 112-130 to provide ZVS when the PFC zero-point switch (i.e., the third switch 116) is turned on and when the inverter switch (i.e., the fifth switch 120) is turned off. The controller 152 synchronizes the PFC zero-point switch and the inverter switch so that the PFC zero-point switch (i.e., the third switch 116) turns on and the inverter switch (i.e., the fifth switch 120) turns off during a synchronized switching period. In one embodiment, during a synchronized switching period, the PFC zero-point switch is turned on and the inverter switch is turned off at substantially the same time. In another embodiment, during a synchronized switching period, the PFC zero-point switch may be turned on a relatively short time before the inverter switch is turned off.

The DC bus switch (i.e., the ninth switch 128) is generally kept on, but is turned off for a short duration around the synchronized switching period of the PFC zero-point and inverter switches. When the DC bus switch (i.e., the ninth switch 128) is turned off, voltage on the positive "floating" DC bus 140 will drop to zero (neutral) whenever the total positive inverter current is higher than total positive PFC converter current (i.e., when the ninth switch 128 provides power to the positive "floating" DC bus 140). This will allow the PFC zero-point switch (i.e., the third switch 116) to turn on having zero voltage across it (i.e., ZVS) and the inverter switch (i.e., the fifth switch 120) to turn off having zero voltage across it (i.e., ZVS). Operation of the UPS 100 to provide ZVS is discussed in greater detail below with regard to FIG. 2.

Figure 2:
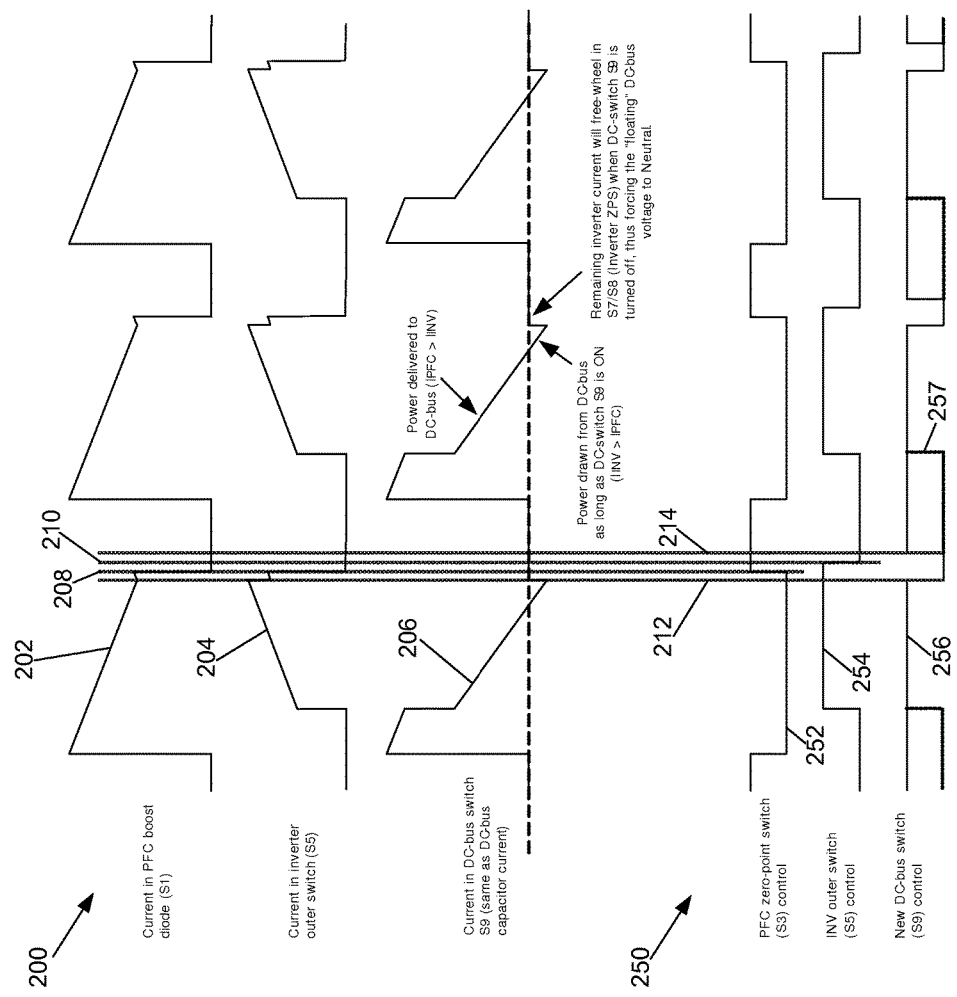
FIG. 2 includes graphs illustrating switching cycles of a UPS system according to aspects of the present disclosure.

FIG. 2 includes graphs illustrating switching cycles of the UPS 100 according to at least one embodiment. FIG. 2 includes a first graph 200 illustrating different currents in the UPS 100 over multiple switching cycles of the UPS 100 and a second graph 250 illustrating different control signals of the UPS 100 over multiple switching cycles of the UPS 100.

The first graph 200 includes a first trace 202 illustrating current in the boost diode of a PFC switch (i.e., the internal diode 148 of the first switch 112 or second switch 114), a second trace 204 illustrating current in the inverter switch (i.e., the fifth switch 120 or sixth switch 122), and a third trace 206 illustrating current in the DC capacitor (i.e., the first 132 or second 134 capacitor) and the DC switch (i.e., the ninth switch 128 or tenth switch 130). The second graph 250 includes a first trace 252 illustrating a control signal from the controller 152 to the gate of the PFC zero-point switch (i.e., the third switch 116 or fourth switch 118), a second trace 254 illustrating a control signal from the controller 152 to the gate of the inverter switch (i.e., the fifth switch 120 or sixth switch 122), and a third trace 256 illustrating a control signal from the controller 152 to the gates of the DC switch (i.e., the ninth switch 128 or tenth switch 130).

The controller 152 synchronizes the turning on of the PFC zero-point switch (i.e., the third switch 116 or fourth switch 118) with the turning off of the inverter switch (i.e., the fifth switch 120 or sixth switch 122) over a synchronized switching period. In one embodiment, the controller 152 introduces a relatively small delay between the turning on of the PFC zero-point switch (i.e., the third switch 116 or fourth switch 118) and the turning off of the inverter switch (i.e., the fifth switch 120 or sixth switch 122). For example, as shown in the second graph 250 of FIG. 2, at a first time 208, a high control signal 252 from the controller 152 turns on the PFC zero-point switch (i.e., the third switch 116 or fourth switch 118). After a relatively small delay and at a second time 210, a low control signal 254 from the controller turns off the inverter switch (i.e., the fifth switch 120 or sixth switch 122). In one embodiment, the delay between the first time 208 and the second time 210 is around 500 ns; however, in other embodiments, the delay between the first time 208 and the second time 210 may be defined differently.

The controller 152 also transmits a high control signal 256 to the DC switch (i.e., the ninth switch 128 or tenth switch 130) to generally maintain the DC switch in an on state. The controller 152 turns off the DC switch (i.e., the ninth switch 128 or tenth switch 130) around the synchronized switching period (i.e., around the first time 208 and the second time 210) of the PFC zero-point switch and the inverter switch. For example, as shown in the second graph 250 of FIG. 2, at a third time 212 (occurring before the first time 208), the controller 152 transmits a low control signal 256 to the DC switch (i.e., the ninth switch 128 or tenth switch 130) to turn off the DC switch. According to one embodiment, the third time 212 occurs 500 ns before the first time 208; however, in other embodiments, the delay between the third time 212 and the first time 208 may be defined differently.

At a fourth time 214 (occurring after the second time 210), the controller 152 transmits a high control signal 256 to the DC switch to turn the DC switch back on. According to one embodiment, the controller 152 may wait to turn the DC switch back on (i.e., maintain the DC switch in an off state) until one of the inverter switches (i.e., the fifth switch 120 or sixth switch 122) is turned on. Such an operation is shown in the second graph 250 by the dotted line 257, and the operation of the switches in this manner may further reduce switching losses.

As seen in the first graph 200, due to the nature of a boost converter, the PFC boost diode current 202 is at a low point just before the PFC zero-point switch (i.e., the third switch 116 or fourth switch 118) is turned on at the first time 208. Similarly, due to the nature of a buck converter, the current 204 in the inverter switch (i.e., the fifth switch 120 or sixth switch 122) is at a high point (i.e., is greater than the PFC boost diode current 202) just before the PFC zero-point switch (i.e., the third switch 116 or fourth switch 118) is turned on at the first time 208. For example, in one embodiment, just before the PFC zero-point switch (i.e., the third switch 116 or fourth switch 118) is turned on at the first time 208, the current 204 in the inverter switch (i.e., the fifth switch 120 or sixth switch 122) is 30 A greater than the PFC boost diode current 202; however, in other embodiments, the difference between the inverter current and the PFC current may be defined differently. Consequently, just before the PFC zero-point switch (i.e., the third switch 116 or fourth switch 118) is turned on at the first time 208, current 206 is drawn from the DC bus 136, 138 to the "floating" DC bus 140, 142 via the DC switches (i.e., the ninth switch 128 and the tenth switch 130).

As discussed above, the DC switches (i.e., the ninth switch 128 and the tenth switch 130) are turned off before the synchronized switching period of the PFC zero-point switches and the inverter switches (i.e., at the third time 212) and turned on after the synchronized switching period (i.e., at the fourth time 214). By turning off the DC switches (i.e., the ninth switch 128 and the tenth switch 130) while the DC switches are delivering power to the "floating" DC busses 140, 142 (e.g., at the third time 212), the voltage on the "floating" DC busses 140, 142 drops to zero.

For example, as seen in the third trace 206 of the first graph 200, power is delivered from the DC busses 136, 138 to the "floating" DC busses 140, 142 just before the synchronized switching period (i.e., at the third time 212) as the PFC boost diode current 202 is at its lowest and the current 204 in the inverter switch (i.e., the fifth switch 120 or sixth switch 122) is at its highest. Once the DC switches (i.e., the ninth switch 128 and the tenth switch 130) are turned off, the PFC converter 101 is not able to deliver enough power to the inverter 103, and voltage on the "floating" DC busses 140, 142 drops to zero as the remaining inverter current is forced to free-wheel in the inverter Zero-Point Switches (ZPS) (i.e., the seventh switch 124 and the eight switch 126).

When the PFC zero-point switches (i.e., the third switch 116 or fourth switch 118) turn on at the first time 208 and the inverter switches (i.e., the fifth switch 120 or sixth switch 122) turn off at the second time 210, the voltage across each switch is zero resulting in ZVS and reduced switching losses. By introducing ZVS at PFC switch turn on and inverter switch turn off, the switching losses of the UPS 100 are reduced, enabling higher overall efficiency of the UPS 100.

As discussed above, switching of the PFC zero-point switch (i.e., the third switch 116 or fourth switch 118) and the inverter switch (i.e., the fifth switch 120 or sixth switch 122) of a segment 102, 104, 106 of the UPS 100 is synchronized during a switching period; however, where the UPS 100 is a 3-phase UPS, the switching of PFC zero-point switches and inverter switches across all three phases of the UPS is synchronized so that all PFC zero-point switches (i.e., the third switch 116 or fourth switches 118) in the UPS 100 turn on at the same time, or a little before, all of the inverter switches (i.e., the fifth switch 120 or sixth switch 122) in the UPS 100 turn off. By synchronizing each PFC zero-point switch and each inverter switch across the UPS 100, the DC switches (i.e., the ninth switch 128 and the tenth switch 130), which are "shared" by each segment 102, 104, 106 (i.e., each phase) of the UPS 100, are operated to introduce ZVS at PFC switch turn on and inverter switch turn off across each phase (i.e., in each segment) of the UPS 100.

Figure 3:
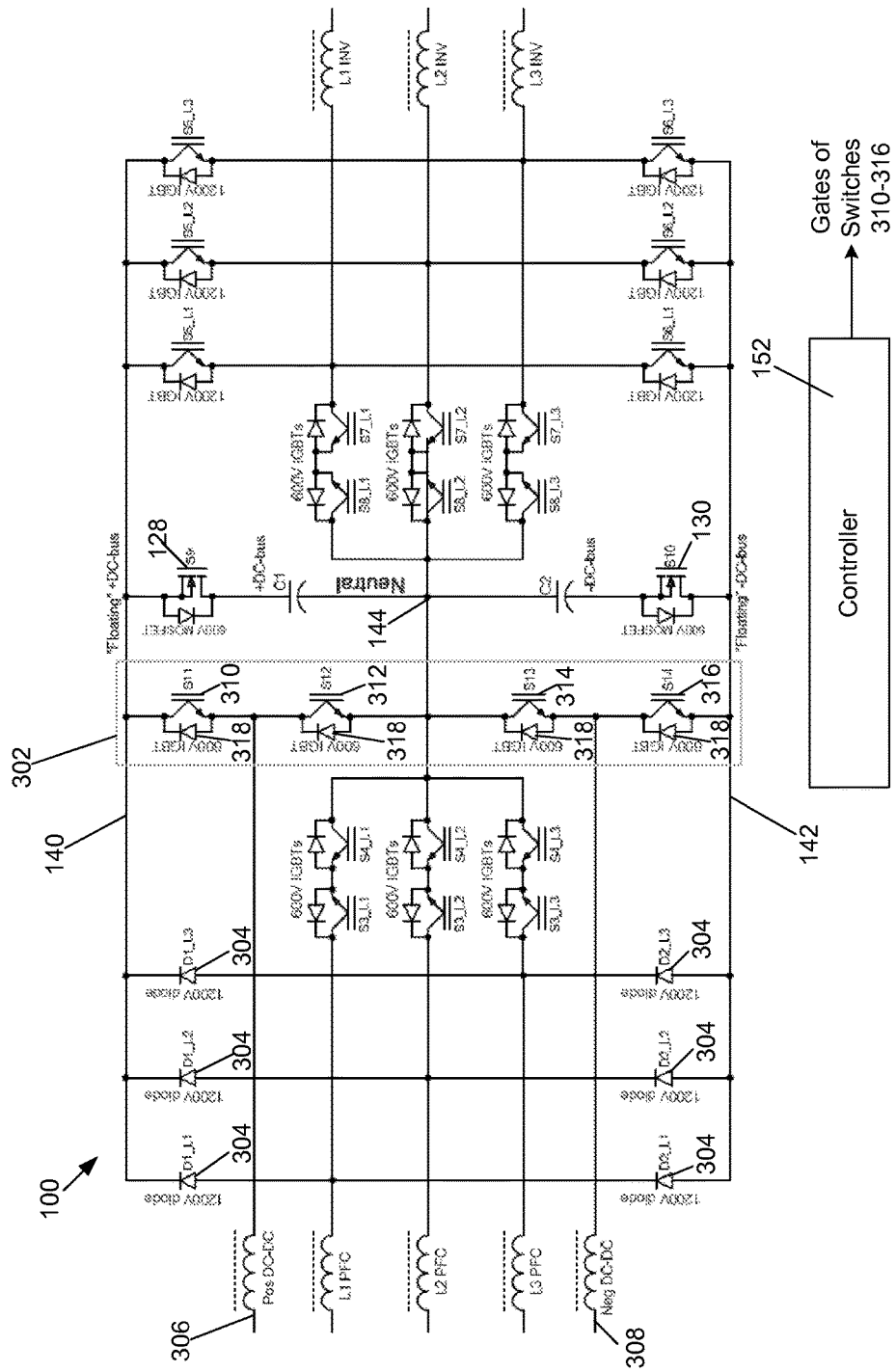
FIG. 3 is a schematic diagram of a 3 phase, 3-level UPS topology including a DC-DC converter according to aspects of the present disclosure.

According to one embodiment, the UPS 100 includes a DC-DC converter for battery operation. For example, according to one embodiment shown in FIG. 3, wherein similar reference numerals refer to similar components from FIG. 1, the UPS 100 includes a DC-DC converter 302.

The DC-DC converter 302 includes an eleventh switch 310, a twelfth switch 312, a thirteenth switch 314, and a fourteenth switch 316. According to one embodiment, the switches 310-316 are 600V IGBTs; however, in other embodiments, the IGBTs 310-3160 may be rated differently or different types of switches may be utilized. Each switch 310-316 includes an internal diode 318 coupled between its collector and emitter. Also, as discussed above, the first switches 112 of the UPS 100 (e.g., as shown in FIG. 1) have been replaced by diodes 304.

The collector of the eleventh switch 310 is coupled to the positive "floating" DC bus 140. The emitter of the eleventh switch 310 is coupled to the collector of the twelfth switch 312. The emitter of the twelfth switch 312 is coupled to the neutral point 144. The collector of the thirteenth switch 314 is also coupled to the neutral point 144. The emitter of the thirteenth switch 314 is coupled to the collector of the fourteenth switch 316. The emitter of the fourteenth switch 316 is coupled to the negative "floating" DC bus 142. A positive DC-DC converter line 306 is coupled to the emitter of the eleventh switch 310 and the collector of the twelfth switch 312. The positive DC-DC converter line 306 is also configured to be coupled to a positive side of a battery. A negative DC-DC converter line 308 is coupled to the emitter of the thirteenth switch 314 and the collector of the fourteenth switch 316. The negative DC-DC converter line 308 is also configured to be coupled to a negative side of a battery.

In a battery mode of operation (e.g., when the AC power received from the power source is inadequate), the DC-DC converter 302 receives backup DC power from the battery, via the positive 306 and negative 308 DC-DC converter lines, and provides regulated DC power to the "floating" DC buses 140, 142. The controller 152 operates the switches 310-316 of the DC-DC converter 302 to provide desired DC power to the "floating" DC buses 140, 142. By coupling the DC-DC converter 302 to the "floating" DC buses 140, 142 having a zero voltage (i.e., when the DC switches 128, 130 are turned off), it is possible to obtain ZVS during boost switch (i.e., twelfth switch 312 or thirteenth switch 314) turn on in battery operation, as long as the total inverter current is greater than the DC-DC converter current for each DC bus at the synchronized switching point (e.g., at time 208). Similarly, ZVS can be obtained during turn-off of the eleventh switch 310 or the fourteenth switch 316 during a charge operation (i.e., during normal operation while the battery is being charged with charging power derived from the AC power source).

Figure 4:
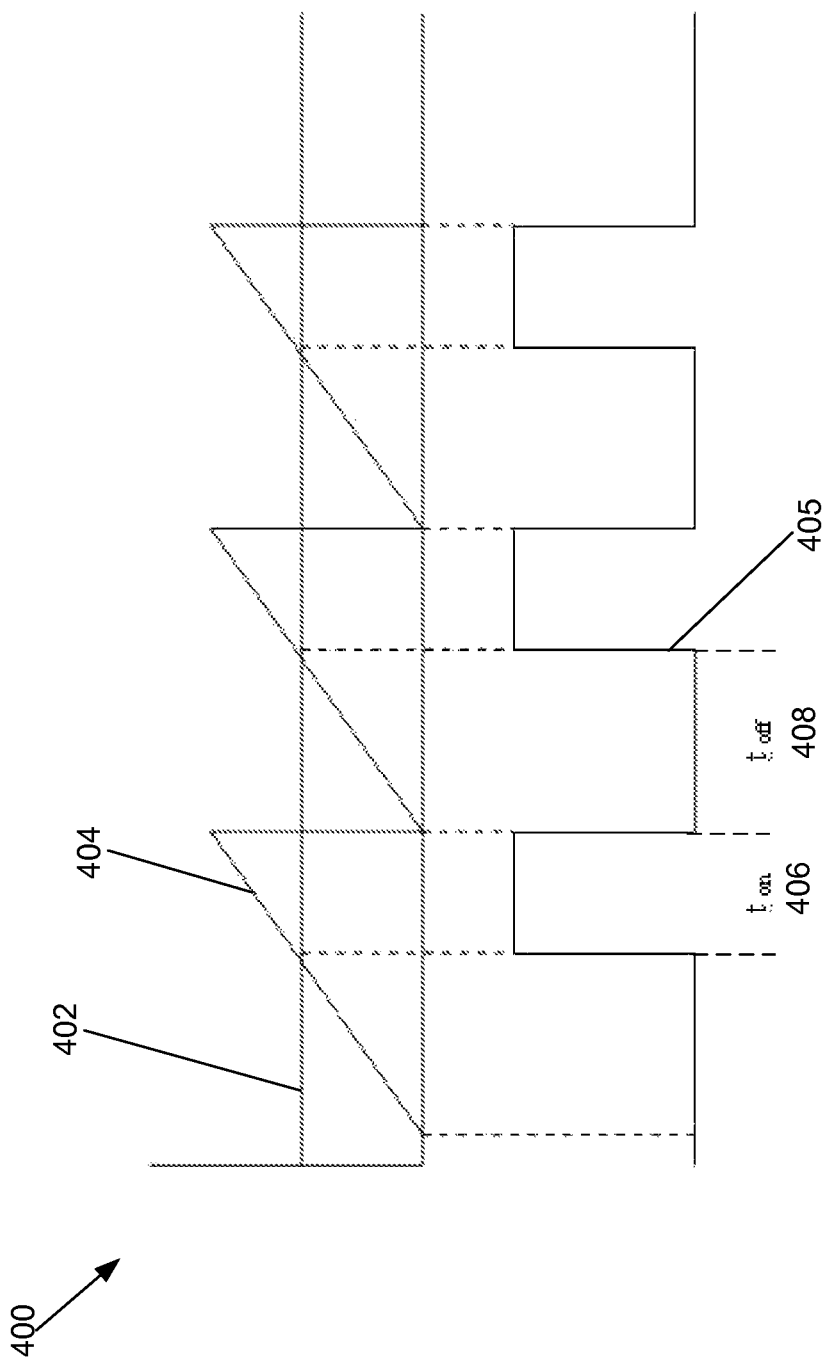
FIG. 4 is a graph illustrating PWM signal generation according to aspects of the present disclosure.

As described above, the operation (i.e., turning on and off) of the PFC zero-point switches and the inverter switches are synchronized across each phase of the system. The controller 152 provides a Pulse Width Modulation (PWM) signal to the gate of each switch to synchronize the operation of each switch. In one embodiment, the PWM signal is generated by comparison of a current reference signal to a fixed ramp waveform. For example, FIG. 4 is a graph 400 illustrating PWM signal generation according to at least one embodiment. The controller 152 compares a current reference signal 402 with a saw tooth waveform 404 to generate a synchronized turn off PWM signal 405. The synchronized turn off PWM signal 405 includes high portions 406 (corresponding to when the saw tooth waveform 404 is greater than the current reference signal 402) and low portions 408 (corresponding to when the saw tooth waveform 404 is less than the current reference signal 402) and is transmitted by the controller 152 to synchronize the turning off of certain switches (e.g., the inverter switches of each phase). A corresponding synchronized turn on PWM signal may also be generated by the controller 152 by inverting the saw tooth waveform 404. Such a synchronized turn on PWM signal is transmitted by the controller 152 to synchronize the turning on of certain switches (e.g., the PFC zero-point switches of each phase). In other embodiments, different types of waveforms or methods may be utilized to generate the PWM signals.

Figure 5:
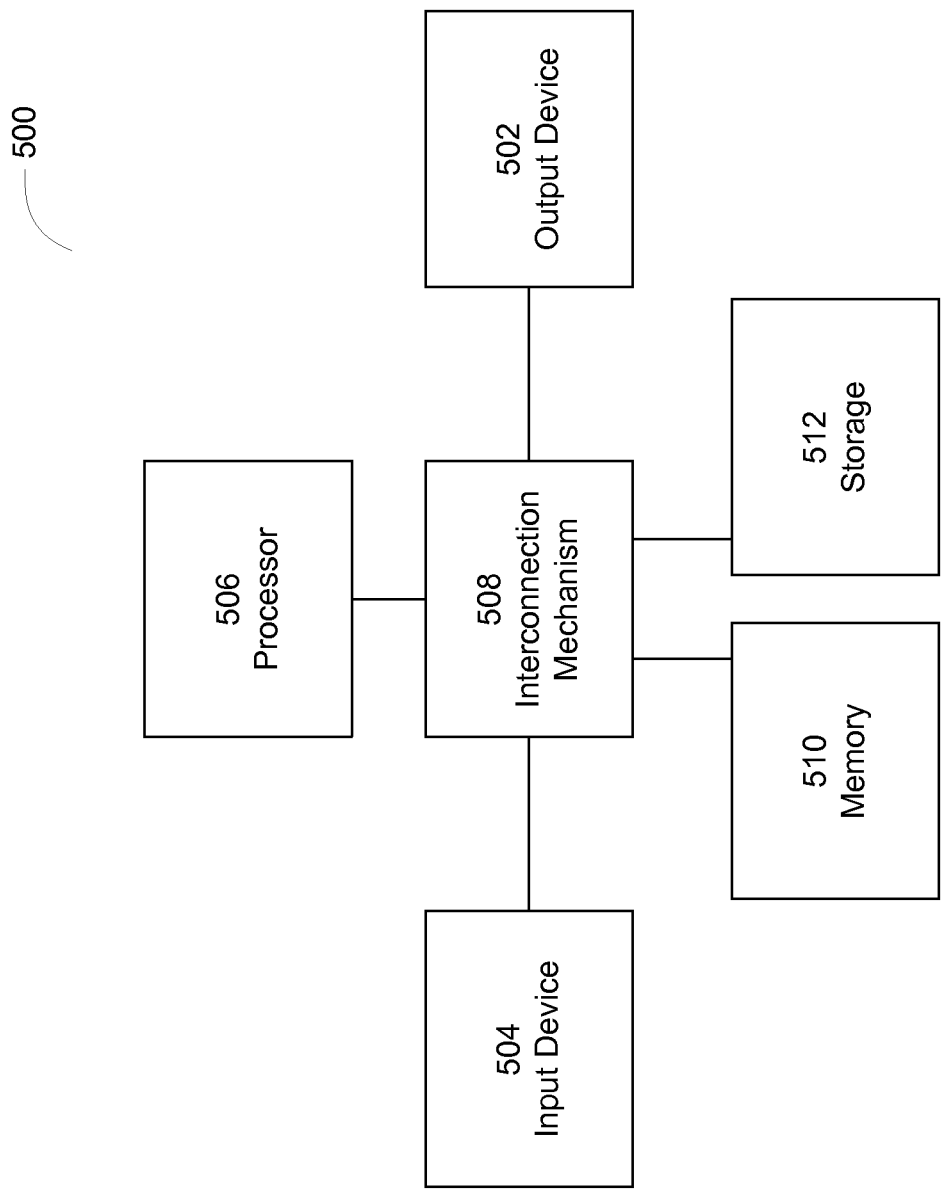
FIG. 5 is a block diagram of a system upon which various embodiments of the invention may be implemented.

FIG. 5 illustrates an example block diagram of computing components forming a system 500 which may be configured to implement one or more aspects disclosed herein. For example, the system 500 may be communicatively coupled to a controller or included within a controller, and/or configured to balance loads coupled to each phase of a data center as discussed above.

The system 500 may include for example a general-purpose computing platform such as those based on Intel PENTIUM-type processor, Motorola PowerPC, Sun Ultra-SPARC, Texas Instruments-DSP, Hewlett-Packard PA-RISC processors, or any other type of processor. System 500 may include specially-programmed, special-purpose hardware, for example, an application-specific integrated circuit (ASIC). Various aspects of the present disclosure may be implemented as specialized software executing on the system 500 such as that shown in FIG. 5.

The system 500 may include a processor/ASIC 506 connected to one or more memory devices 510, such as a disk drive, memory, flash memory or other device for storing data. For example, in one embodiment, the system 500 includes a Cortex-M4 Processor manufactured by ARM Holdings of Cambridge, UK; however, in other embodiments, other appropriate processors may be utilized.

Memory 510 may be used for storing programs and data during operation of the system 500. Components of the computer system 500 may be coupled by an interconnection mechanism 508, which may include one or more buses (e.g., between components that are integrated within a same machine) and/or a network (e.g., between components that reside on separate machines). The interconnection mechanism 508 enables communications (e.g., data, instructions) to be exchanged between components of the system 500.

The system 500 also includes one or more input devices 504, which may include for example, a keyboard or a touch screen. The system 500 includes one or more output devices 502, which may include for example a display. In addition, the computer system 500 may contain one or more interfaces (not shown) that may connect the computer system 500 to a communication network, in addition or as an alternative to the interconnection mechanism 508.

The system 500 may include a storage system 512, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 510 that allows for faster access to the information by the processor/ASIC than does the medium. This memory 510 may be a volatile, random access memory such as a dynamic random access memory (DRAM) or static memory (SRAM). It may be located in storage system 512 or in memory system 510. The processor 506 may manipulate the data within the integrated circuit memory 510 and then copy the data to the storage 512 after processing is completed. A variety of mechanisms are known for managing data movement between storage 512 and the integrated circuit memory element 510, and the disclosure is not limited thereto. The disclosure is not limited to a particular memory system 510 or a storage system 512.

The system 500 may include a general-purpose computer platform that is programmable using a high-level computer programming language. The system 500 may be also implemented using specially programmed, special purpose hardware, e.g. an ASIC. The system 500 may include a processor 506, which may be a commercially available processor such as the well-known Pentium class processor available from the Intel Corporation. Many other processors are available. The processor 506 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

In addition to ZVS, the UPS 100 may also provide another benefit. Typically, in circuits involving a half-bridge such as an inverter application, there is a risk of shoot-through. Shoot through typically occurs when complementary inverter switches (e.g., the fifth switch 120 and the sixth switch 122) are turned on simultaneously due to a failure (e.g., such as a faulty gate-driver, unintended control signals, a faulty semiconductor, etc.). This simultaneous turning on of complementary switches may short circuit the DC-busses and result in damage to components and potential arc flash due to resulting high peak currents and power dissipation. The risk of shoot through is commonly reduced by implementation of more advanced gate-drivers which include a desaturation function able to detect if a switch is driven in the active region. Such gate-drivers are more complicated, have more components, are more expensive, and in the case of standard UPS topologies, need to be placed on all inverter switches to obtain full-shoot-through protection. However, in the UPS 100, because it is possible to cut off the DC busses by turning off the DC switches 128, 130, it is also possible to achieve full shoot-through protection by only adding desaturation gate drivers on the ninth switch 128 and the tenth switch 130.

As described above, the UPS 100 is utilized in three-phase UPS systems; however, in other embodiments, the UPS 100 may also be utilized in single-phase UPS systems. In other embodiments, the UPS 100

As described above, just before the PFC zero-point switch (i.e., the third switch 116 or fourth switch 118) is turned on, the current 204 in the inverter switch (i.e., the fifth switch 120 or sixth switch 122) is typically greater than the PFC boost diode current 202; however, in other embodiments, the PFC boost diode current 202 may be greater than the current 204 in the inverter switch. In such an embodiment, ZVS may be obtained for turn off of the inverter switch (i.e., the fifth switch 120 or sixth switch 122). Also in such an embodiment, the PFC boost diode (i.e., the internal diode 148 of the first switch 112) is in series with the body diode 150 of the DC switch (i.e., the ninth switch 128) while being commutated, resulting in lowered reverse recovery losses.

As described above, the UPS 100 is a NPC-2 based 3-level UPS topology; however, in other embodiments, similar configurations may be utilized in other types of UPS topologies, e.g., an NPC-1 topology or a 2-level topology (e.g., in a similar topology as shown in FIG. 1 where the third switch 116, the fourth switch 118, the seventh switch 124, and the eight switch 126 are omitted).

At least some embodiments described herein provide a 3-level UPS topology that reduces overall switching losses (i.e., provides higher efficiency). The 3-level UPS topology introduces ZVS through the operation of DC switch circuits "in series" with the DC-busses that are "shared" by all phases of the UPS. The "shared" DC switch circuits are operated to drive voltage across PFC switches to zero during switch turn-on and to drive voltage across inverter switches to zero during switch turn-off, thus reducing switching losses and enabling higher overall efficiency with a limited number of additional components.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A power supply system comprising:
    an input configured to receive input AC power from an input power source;
    an output configured to provide output AC power to a load;
    a converter coupled to the input and configured to convert the input AC power into converted DC power, the converter including at least one first switch coupled between the input and a neutral point;
    a first DC bus coupled to the converter and configured to receive the converted DC power;
    an inverter coupled to the first DC bus and the output and configured to convert DC power from the first DC bus into the output AC power, the inverter including at least one second switch coupled between the first DC bus and the output;
    a first DC switch circuit coupled between the first DC bus and the neutral point;
    an energy storage device selectively coupled to the first DC bus via the first DC switch circuit; and
    a controller coupled to the first DC switch circuit and configured to operate the first DC switch circuit such that voltage on the first DC bus is zero during switching operation of the at least one first switch and the at least one second switch.

2. The power supply system of claim 1,
    wherein the controller is coupled to the at least one first switch and the at least one second switch and is further configured to operate switching of the at least one first switch to generate the DC power, to operate switching of the at least one second switch to generate the output AC power, and to operate the first DC switch circuit such that voltage across the at least one first switch is zero during turn-on switching and voltage across the at least one second switch is zero during turn-off switching.

3. The power supply system of claim 2, wherein first DC switch circuit comprises:
    a DC switch coupled between the first DC bus and the neutral point; and
    a diode coupled in parallel with the DC switch between the first DC bus and the neutral point,
    wherein in operating the first DC switch circuit such that voltage on the first DC bus is zero, the controller is further configured to operate the DC switch to turn off.

4. The power supply system of claim 3, wherein the controller is further configured to synchronize the turn-on switching of the at least one first switch with the turn-off switching of the at least one second switch over a synchronized switching period.

5. The power supply system of claim 4, wherein the controller is further configured to turn off the DC switch at a first time before the synchronized switching period.

6. The power supply system of claim 5, wherein the power supply system is configured to operate such that at the first time before the synchronized switching period, current at the output is greater than current at the input.

7. The power supply system of claim 6, further comprising
    a second DC bus coupled between the energy storage device and the first DC switch circuit,
    wherein the energy storage device is a capacitor coupled to the neutral point, and
    wherein at the first time before the synchronized switching period, the DC power converted by the inverter into the output AC power is derived from the converted DC power and DC power from the second DC bus.

8. The power supply system of claim 2, further comprising:
    at least one DC input line configured to be coupled to a DC source; and
    a DC/DC converter coupled between the at least one DC input line and the first DC bus and configured to receive backup DC power from the DC source and provide regulated DC power to the first DC bus,
    wherein the DC power converted by the inverter into the output AC power is derived from at least one of the converted DC power and the backup DC power.

9. The power supply system of claim 8, wherein the DC/DC converter comprises:
    at least one first DC/DC switch coupled between the at least one DC input line and the neutral point,
    wherein the controller is further coupled to the at least one first DC/DC switch and is further configured, where the DC power converted by the inverter into the output AC power is derived from the backup DC power, to operate the at least one first DC/DC switch to generate the regulated DC power, and to operate the first DC switch circuit such that voltage across the at least one first DC/DC switch is zero during turn-on.

10. The power supply system of claim 9, wherein the DC/DC converter comprises:
    at least one second DC/DC switch coupled between the at least one DC input line and the first DC bus,
    wherein the controller is further coupled to the at least one second DC/DC switch and is further configured, where the DC power converted by the inverter into the output AC power is derived from the converted DC power, to operate the at least one second DC/DC switch to generate battery charging power from the converted DC power, and to operate the first DC switch circuit such that voltage across the at least one second DC/DC switch is zero during turn-off.

11. The power supply system of claim 1, wherein the power supply system is a three-phase power supply system including multiple segments, each segment configured to operate on one phase of 3-phase power received from the input power source, wherein the first DC switch circuit is shared by multiple segments of the three-phase power supply system, and wherein the controller is further configured to synchronize the switching operation of the at least one first switch and the at least one second switch across each segment of the power supply system.

12. The power supply system of claim 1, further comprising:

a second DC bus coupled to the converter and configured to receive the converted DC power; and a second DC switch circuit coupled between the second DC bus and the neutral point, wherein the controller is further coupled to the second DC switch circuit and is further configured to operate the second DC switch circuit such that voltage on the second DC bus is zero during switching operation of the converter and the inverter.

13. A method for operating a power supply system, the power supply system comprising an input, a converter coupled to the input, a first DC bus coupled to the converter, an inverter coupled to the first DC bus, an energy storage device, and an output, the method comprising:

receiving, at the input, input AC power from a power source;

converting, with the converter, the input AC power into converted DC power;

providing the converted DC power to the first DC bus;

converting, with the inverter, DC power from the first DC bus into output AC power;

providing the output AC power to the output; and controlling the power supply system such that voltage on the first DC bus goes to zero to provide Zero Voltage Switching (ZVS) in the converter and the inverter, the controlling including selectively decoupling the energy storage device from the first DC bus.

14. The method of claim 13, wherein converting the input AC power includes switching at least one first switch of the converter to generate the converted DC power;

wherein converting DC power from the first DC bus includes switching at least one second switch of the converter to generate the output AC power; and wherein controlling the power supply system such that voltage on the first DC bus goes to zero includes driving voltage across the at least one first switch to zero during turn-on switching and voltage across the at least one second switch to zero during turn-off switching.

15. The method of claim 14, wherein the power supply system further comprises a first DC switch coupled between a neutral point and the first DC bus, and wherein driving voltage across the at least one first switch to zero and voltage across the at least one second switch to zero includes turning off the first DC switch.

16. The method of claim 15, further comprising synchronizing the turn-on switching of the at least one first switch with the turn-off switching of the at least one second switch over a synchronized switching period.

17. The method of claim 16, wherein turning off the first DC switch includes turning off the first DC switch at a first time before the synchronized switching period when current at the output is greater than current at the input.

18. The method of claim 13, wherein the power supply system further comprises a second DC bus coupled to the converter, and wherein the method further comprises controlling the power supply system such that voltage on the second DC bus goes to zero to provide ZVS in the converter and the inverter.

19. The method of claim 13, wherein the power supply system is a three-phase power supply system, wherein controlling the power supply system such that voltage on the first DC bus goes to zero includes selectively driving voltage on the first DC bus to zero to provide ZVS in the converter and the inverter across multiple phases of the power supply system, and wherein the method further comprises synchronizing switching operation of the converter and the inverter across multiple phases of the power supply system.

20. A three-phase power supply system comprising:

a plurality of inputs, each configured to receive one-phase of input 3-phase power from an input power source;

a plurality of outputs, each configured to provide one-phase of output 3-phase power to a load;

a converter coupled to the plurality of inputs and configured to convert the received input 3-phase power into converted DC power;

at least one DC bus coupled to the converter and configured to receive the converted DC power;

an inverter coupled to the at least one DC bus and the plurality of outputs and configured to convert DC power from the at least one DC bus into the output 3-phase power;

an energy storage device selectively coupled to the at least one DC bus; and means for providing Zero Voltage Switching (ZVS) in the converter and the inverter across each phase of the three-phase power supply system.

\* \* \* \* \*